United States Patent
Huang

(10) Patent No.: US 12,217,354 B2
(45) Date of Patent: Feb. 4, 2025

(54) FILE FORMAT FOR POINT CLOUD DATA

(71) Applicant: ZTE Corporation, Guangdong (CN)

(72) Inventor: Cheng Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 79 days.

(21) Appl. No.: 17/704,781

(22) Filed: Mar. 25, 2022

(65) Prior Publication Data

US 2022/0215616 A1   Jul. 7, 2022

Related U.S. Application Data

(63) Continuation of application No. PCT/CN2019/109490, filed on Sep. 30, 2019.

(51) Int. Cl.
| | |
|---|---|
| G06T 15/08 | (2011.01) |
| G06T 7/11 | (2017.01) |
| G06V 10/25 | (2022.01) |
| H04N 19/597 | (2014.01) |

(52) U.S. Cl.
CPC ............... *G06T 15/08* (2013.01); *G06T 7/11* (2017.01); *G06V 10/25* (2022.01); *G06T 2207/10028* (2013.01); *G06T 2210/12* (2013.01)

(58) Field of Classification Search
None
See application file for complete search history.

(56) References Cited

U.S. PATENT DOCUMENTS

| | | |
|---|---|---|
| 2008/0310757 A1 | 12/2008 | Wolberg et al. |
| 2018/0276885 A1 | 9/2018 | Singh et al. |
| 2019/0139266 A1 | 5/2019 | Budagavi et al. |
| 2020/0250798 A1 | 8/2020 | Lasang et al. |
| 2020/0304834 A1* | 9/2020 | Wang .................... H04N 19/597 |
| 2020/0364929 A1 | 11/2020 | Li et al. |
| 2021/0174559 A1 | 6/2021 | Nakagami et al. |
| 2022/0051443 A1* | 2/2022 | Hamza ................... H04N 19/70 |
| 2022/0141487 A1* | 5/2022 | Oh ........................... G06T 15/00 |
| | | 375/240.08 |

FOREIGN PATENT DOCUMENTS

| | | |
|---|---|---|
| CN | 107067462 A | 8/2017 |
| CN | 110009743 A | 7/2019 |
| CN | 110189412 A | 8/2019 |
| WO | 2019082958 A1 | 5/2019 |

(Continued)

OTHER PUBLICATIONS

International Search Report and Written Opinion mailed on Jun. 23, 2020 for International Application No. PCT/CN2019/109490, filed on Sep. 30, 2019 (7 pages).

(Continued)

*Primary Examiner* — Michael J Cobb
(74) *Attorney, Agent, or Firm* — Perkins Coie LLP

(57) ABSTRACT

A method of point cloud data processing includes determining a 3D region of a point cloud data and a 2D region of a point cloud track patch frame onto which one or more points of the point cloud data are projected; and reconstructing, based on patch frame data of the a point cloud track included in the 2D region and video frame data of corresponding point cloud component tracks, the 3D region of the point cloud data.

17 Claims, 8 Drawing Sheets

---

S110: determining a 3D region of a point cloud data and a 2D region of a point cloud track patch frame onto which one or more points of the 3D region are projected S120: reconstructing, from patch frame data included in the 2D region and video frame data of corresponding point cloud component tracks, the 3D region of the point cloud data.

(56) References Cited

FOREIGN PATENT DOCUMENTS

WO      2019142666 A1     7/2019

OTHER PUBLICATIONS

Japanese office action issued in JP Patent Application No. 2022-519702, dated Jul. 4, 2023, 7 pages. English translation included.
Japanese notice of allowance issued in JP Patent Application No. 2022-519702, dated Dec. 1, 2023, 3 pages. English translation included.
European Search Report for EP Patent Application No. 19948013.8, dated Oct. 5, 2022, 10 pages.
Aksu, "Technologies Under Consideration for Carriage of Point Cloud," International Organisation for Standardisation, ISO/IEC JTC1/SC29/WG 11, Coding of Moving Pictures and Audio, MPEG2018/N18414, Geneva, Switzerland, Mar. 2019, 40 pages.
Oh, "Evaluation Results for CE on Partial Access of Point Cloud Data," LG Electronics Inc., International Organisation for Standardisation, ISO/IEC JTC1/SC29/WG11, Coding of Moving Pictures and Audio, MPEG2017/m50227, Geneva, Switzerland, Oct. 2019, 5 pages.
Hamza et al., "Evaluation Result for CE on Partial Access of PC Data," InterDigital Communications, Inc., International Organisation for Standardisation, ISO/IEC JTC1/SC29/WG11, Coding of Moving Pictures and Audio, m50051, Geneva, Switzerland, Oct. 2019, 7 pages.
Wang et al., "Signaling of 2D and 3D Spatial Relationship of V-PCC Tiles for their Partial Access and Delivery," MediaTek USA, Inc., International Organisation for Standardisation, ISO/IEC JTC1/SC29/WG11, Coding of Moving Pictures and Audio, MPEG2019/m48109, Gothenburg, Sweden, Jul. 2019, 12 pages.
Korean office action issued in KR Patent Application No. 10-2022-7014438, dated May 29, 2023, 7 pages. English translation included.
Korean notice of allowance issued in KR Patent Application No. 10-2022-7014438, dated Dec. 26, 2023, 7 pages. English translation included.
Chinese office action issued in CN Patent Application No. 201980100291.2, dated Oct. 31, 2024, 15 pages. English translation included.

* cited by examiner

S510: determining, based on a sample entry of a timed metadata track of a point cloud space region or an element in a sample a 3D region of the point cloud, and a point in the 3D region projected onto the 2D region on the point cloud patch frame.

FILE FORMAT FOR POINT CLOUD DATA

CROSS-REFERENCE TO RELATED APPLICATIONS

This application is a continuation of International Patent Application No. PCT/CN2019/109490, filed on Sep. 30, 2019, the contents of which are incorporated herein by reference in their entirety.

TECHNICAL FIELD

This patent document is directed the multimedia data processing and transmission technologies and to a point cloud data processing method, apparatus and system.

BACKGROUND

Video encoding uses compression tools to encode two-dimensional video frames into a compressed bitstream representation that is more efficient for storing or transporting over a network. Traditional video coding techniques that use two-dimensional video frames for encoding sometimes are inefficient for representation of visual information of a three-dimensional visual scene.

SUMMARY

This patent document describes, among other things, techniques for encoding and decoding digital video that carries visual information related to multi-dimensional images.

In one example aspect, a method of point cloud data processing is disclosed. The method includes determining a 3D region of a point cloud data and a 2D region of a point cloud track patch frame onto which one or more points of the 3D region are projected and reconstructing, from patch frame data included in the 2D region and video frame data of corresponding point cloud component tracks, the 3D region of the point cloud data.

In another example aspect, another method of point cloud data processing is disclosed. The method includes determining a 3D region of a point cloud data and a point cloud component track group corresponding to the 3D region and reconstructing, based on video frame data from point cloud component tracks in the point cloud component track group and corresponding point cloud track patch frame data, the 3D region of the point cloud data.

In another example aspect, an apparatus for point cloud data processing is disclosed.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Figure 1:
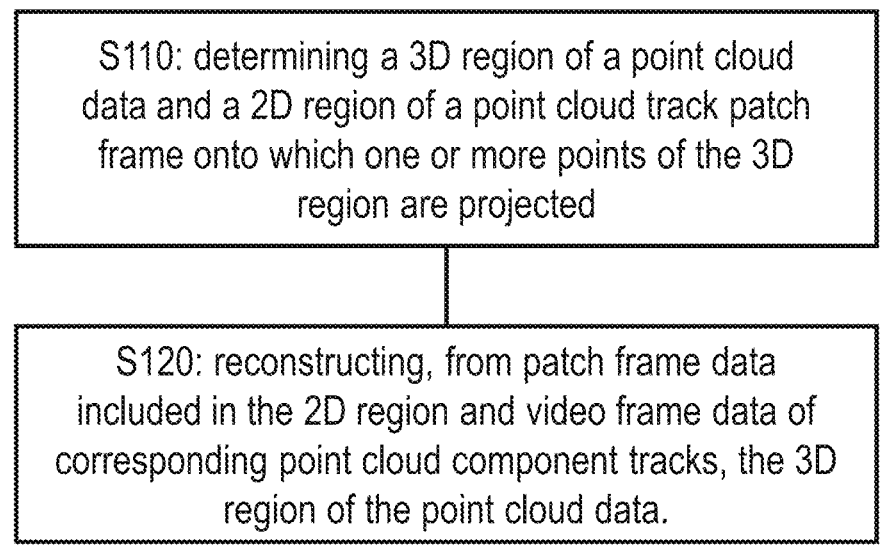
FIG. 1 is a flowchart of an example method of 3D point cloud data processing.

Section headings are used in the present document only to improve readability and do not limit scope of the disclosed embodiments and techniques in each section to only that section. Certain features are described using the example of the H.264/AVC (advanced video coding) and H.265/HEVC and MPEG standards. However, applicability of the disclosed techniques is not limited to only H.264/AVC or H.265/HEVC systems.

In the present document, various syntax elements are disclosed in different sections for point cloud data processing. However, it is understood that a syntax element with same name will have a same format and syntax as used in different sections, unless otherwise noted. Furthermore, the different syntax elements and structures described under different section headings may be combined together in various embodiments. In addition, while the specific structures are described as implementation examples, it will be understood that the order of various entries of syntax structures may be changed, unless otherwise noted in the present document.

Video-based point cloud compression (VPCC or V-PCC) represents a volumetric encoding of point cloud visual information. A V-PCC bitstream, containing coded point cloud sequence (CPCS), is composed of VPCC units carrying sequence parameter set (SPS) data, a patch information bitstream, a 2D video encoded occupancy map bitstream, a 2D video encoded geometry bitstream, and zero or more 2D video encoded attribute bitstreams.

Users typically have 6 degrees of freedom (DoF) to view the point cloud object. At any given point in time, only a part of the available point cloud object will be visible to each of the users depending on the user's location, viewport, field of view, etc. For many applications, the entire point cloud object data does not have to be delivered, decoded and rendered. In order to support the partial access and delivery of the point cloud object, there is a need to support for identifying one or more 3D spatial sub-regions to fully cover all possibilities of DoF and directions from which a user wishes to view the point cloud object.

Example Structure of V-PCC ISOBMFF Container

V-PCC units in a V-PCC elementary stream are mapped to individual tracks within the ISOBMFF file based on their types. There are two types of tracks in a multi-track ISOBMFF V-PCC container: V-PCC track and V-PCC component track.

The V-PCC track is a track carrying the volumetric visual information in the V-PCC bistream, which includes the patch information sub-bitstream and the sequence parameter sets.

V-PCC component tracks are restricted video scheme tracks which carry 2D video encoded data for the occupancy map, geometry, and attribute sub-bitstreams of the V-PCC bitstream.

Based on this layout, a V-PCC ISOBMFF container shall include the following:

A V-PCC track which contains sequence parameter sets (in the sample entry) and samples carrying the payloads of the sequence parameter set V-PCC unit (unit type VPCC_SPS) and patch data group V-PCC units (unit type VPCC_PDG). This track also includes track references to other tracks carrying the payloads of video compressed V-PCC units (i.e., unit types VPCC_OVD, VPCC_GVD, and VPCC_AVD).

A restricted video scheme track where the samples contain access units of a video-coded elementary stream for occupancy map data (i.e., payloads of V-PCC units of type VPCC_OVD).

One or more restricted video scheme tracks where the samples contain access units of video-coded elementary streams for geometry data (i.e., payloads of V-PCC units of type VPCC_GVD).

Zero or more restricted video scheme tracks where the samples contain access units of video-coded elementary streams for attribute data (i.e., payloads of V-PCC units of type VPCC_AVD).

BRIEF DISCUSSION

The techniques disclosed in the present application may be used to encode (and decode) a point cloud into a bitstream representation using a file format that is compatible with the ISO BMFF and at the same time allows for an omnidirectional video processing technique, which implements natural switching between omnidirectional video of different viewpoints, thereby improving a user viewing experience.

The technical solution of the embodiment of the present invention provides the view group information for the omnidirectional video track and indicates that all omnidirectional video tracks belonging to the same view point constitute a track group corresponding to the view. In the omnidirectional video viewpoint switching process, the consistency of the omnidirectional video window content before and after the viewpoint switching is ensured, and the natural switching between the omnidirectional video of different viewpoints is realized, thereby improving the user viewing experience.

In general, embodiments based on the disclosed technique may be used for video data processing. In some embodiments, omnidirectional video data is stored in a file based on an ISO (International Organization for Standardization) basic media file format. Among them, the ISO basic media file format such as the restricted scheme information box, the track reference box, and the track group box can refer to the ISO/IEC JTC1/SC29/WG11 Moving Picture Experts Group (MPEG) MPEG-4. Part 12 ISO Base Media File Format to operate.

All the data in the ISO basic file format is installed in a box. The ISO basic file format represented by an MP4 file is composed of several boxes, each of which has a type and a length and can be regarded as a data object. A box can contain another box called a container box. An MP4 file will first have only one "ftyp" type of box, as a markup of the file format and contain some information about the file. There will be and only one "MOOV" type of box (Movie Box), which is a container box whose subbox contains metadata information for the media. The media data of the MP4 file is included in the "mdat" type of media box (Media Data Box), which is also a container box, which may or may not be available (when the media data refers to other files), the structure of the media data is composed of metadata.

A timed metadata track is a mechanism in the ISO Base Media File Format (ISOBMFF) that establishes timed metadata associated with a particular sample. Timed metadata is less coupled to media data and is usually "descriptive."

In the present document, several technical solutions are provided to allow representation of a 3D or spatial region of a point cloud data, such as the V-PCC data of MPEG, into a format that is compatible with the traditional 2D video formats such as the MP4 or the ISOBMFF format. One advantageous aspect of the proposed solutions is to be able to reuse traditional 2D video techniques and syntax for implementation of the new functionality.

Solution 1

As shown in the example flowchart of FIG. 1, this method includes the following steps:

Step S110 includes determining a 3D region of a point cloud data and a 2D region of a point cloud track patch frame onto which one or more points of the 3D region are projected.

Step S120 includes reconstructing, from patch frame data included in the 2D region and video frame data of corresponding point cloud component tracks, the 3D region of the point cloud data.

In some embodiments, the determining operation in S110 may be performed by using more than one 2D regions corresponding to the one or more points in the 3D region.

In some embodiments, the spatial region (e.g. a 3D region) of a point cloud data includes, or is described using, at least one of the following information:

SpatialRegionInfoStruct( ) provide information of a spatial region, including the x, y, z coordinate offset of the spatial region and the width, height, and depth of the region, and its source bounding box information.

1) 3D bounding box parameters (3D spatial position) of a point cloud data, including: the x, y, z coordinate offset of the point cloud data, and the width, height and depth of the point cloud data;
2) 3D region (or a 3D block) parameters of a point cloud data, including: the x, y, z coordinate offset of a 3D region of a point cloud data, and the width, height and depth of a 3D region of the point cloud data;
3) Number of points of a point cloud data;
4) A label of a point cloud data;
5) Number and type of attributes of a point cloud.

Alternatively, the spatial region (e.g. a 3D region) of the point cloud data includes at least the following information:

1) The 3D bounding box width, height and depth of a point cloud data, used to represent the size of the bounding box of a point cloud data, and the number of 3D blocks which the 3D bounding box of a point cloud data is divided into in the x, y, and z coordinate directions, and the width, height and depth of the 3D blocks; or
2) The 3D bounding sphere radius of a point cloud data, specifying the radius of the bounding sphere containing the point cloud data, and the number of 3D subspheres which the 3D bounding sphere of a point cloud data is divided into in the row, column, and layer directions, and the width, height and thickness of the 3D subspheres.

The SpatialRegionInfoStruct( ) provides spatial region information of a point cloud data, including a 3D region of a point cloud data and a 2D region of a point cloud track patch frame onto which one or more points of the 3D region are projected, and is defined as follows:

Syntax Example

```
aligned(8) SpatialRegionInfoStruct( ) {
    unsigned int(16)    num_points;
    string label;
    unsigned int(4)     num_attributes;
    for (i = 0; i < num_attributes; i++) {
        unsigned int(4) attribute_type[i];
    }
    unsigned int(1)     3d_bounding_box_present_flag;
    if(3d_bounding_box_present_flag){
        3DRegionStruct( );
    }
    unsigned int(1) 2d_bounding_box_update_flag;
    if(2d_bounding_box_update_flag)
        2DRegionStruct( );
    }
}
aligned(8) class 3DRegionStruct(delta_included_flag) {
    unsigned int(16) region_id;
    unsigned int(16) 3d_bounding_box_x;
    unsigned int(16) 3d_bounding_box_y;
    unsigned int(16) 3d_bounding_box_z;
    if (delta_included_flag) {
        unsigned int(16) 3d_bounding_box_delta_x;
        unsigned int(16) 3d_bounding_box_delta_y;
        unsigned int(16) 3d bounding box delta z;
    }
    else {
        unsigned int(16) 3d_bounding_box_width;
        unsigned int(16) 3d_bounding_box_height;
        unsigned int(16) 3d_bounding_box_depth;
    }
}
aligned(8) class 2DRegionStruct( ) {
    unsigned int(16) bounding_box_top;
    unsigned int(16) bounding_box_left;
    unsigned int(16) bounding_box_width;
    unsigned int(16) bounding box height;
}
```

Semantics Example number_points specify the number of points of a point cloud data.

lable specify the label of a point cloud data.

number_attributes specify the number of attributes of a point cloud data.

attributes_type[i] specify the type of the $i^{th}$ attribute of a point cloud data.

3d_bounding_box_present_flag indicates whether a 3D bounding box parameters of a point cloud data is present.

2d_bounding_box_update_flag indicates whether a 2D region of a point cloud track patch frame onto which one or more points of a 3D region of the point cloud data are projected is updated.

region_id specify the identity of a 3D region of a point cloud data.

3d_bounding_box_x, 3d_bounding_box_y and 3d_bounding_box_z specify the minimum value of x, y, and z offset, respectively, of the 3D region corresponding to the 3D spatial part of the source bounding box in the Cartesian coordinates.

delta_included_flag indicates whether 3d_bounding_box_delta_x, 3d_bounding_box_height, and 3d_bounding_box_delta_z is present in the 3DRegionStruct( ).

3d_bounding_box_delta_x, 3d_bounding_box_delta_y and 3d_bounding_box_delta_z specify the maximum value of x, y, and z offset, respectively, of the 3D region corresponding to the 3D spatial part of the source bounding box in the Cartesian coordinates.

3d_bounding_box_width, 3d_bounding_box_height, and 3d_bounding_box_depth indicate the width, height, and depth, respectively, of the spatial region corresponding to the 3D spatial part of the source bounding box in the Cartesian coordinates.

bounding_box_top, bounding_box_left specify the distance from the top and left, respectively, of a rectangular 2D region to the top edge of the patch frame bounding_box_width, bounding_box_height specify the width and height, respectively, of a rectangular 2D region in the patch frame.

Partitioning of patch frames, tiles, and tile groups may be performed as follows.

A patch frame from V-PCC track could be partitioned into tiles and tile groups.

A patch frame is divided into one or more tile rows and one or more tile columns. A.

tile is a rectangular region of a patch frame.

A tile group contains a number of tiles of a patch frame.

In some embodiments, only rectangular tile groups are supported. In this mode, a tile group contains a number of tiles of a patch frame that collectively form a rectangular region of the patch frame.

Accordingly, a 2D region of a point cloud track patch frame onto which one or more points of a 3D region of the point cloud data are projected, is generated based on at least the following division principles:

1. A 2D region of a point cloud track patch frame onto which one or more points of a 3D region of the point cloud data are projected is defined based on the patch position on the patch frame.
2. A 2D region of a point cloud track patch frame onto which one or more points of a 3D region of the point cloud data are projected is defined based on the tile position on the patch frame, which is partitioned into tiles.
3. A 2D region of a point cloud track patch frame onto which one or more points of a 3D region of the point cloud data are projected is defined based on the tile group position on the patch frame, which is partitioned into tile groups.

Correspondingly, the 2D region on the point cloud patch frame includes at least one of the following information:

1) 2D region position parameters, including: x, y offset of 2D bounding box, and width, height of 2D bounding box.
2) 2D region Layer index information.
3) 2D region description information (e.g. intent).
4) Point cloud patch information (e.g. number of patches).
5) Point cloud tile information.
6) Point cloud tile group information.

In some embodiments, the point cloud reconstruction operation in S120 may be performed as follows.

Inputs to the point cloud reconstruction process are:
the block to patch mapping information included in the 2D region,
the decoded geometry video frames of corresponding point cloud component tracks at nominal resolution,
the decoded attribute video frames of corresponding point cloud component tracks at nominal resolution,
the decoded occupancy map video frames of corresponding point cloud component tracks at nominal resolution, and/or
the frame index in output order.

In some embodiments, the above inputs may be based on an upscaling operation to provide visually accurate coverage of the point cloud data.

Outputs of the point cloud reconstruction process are:

the container holding a list of points in the reconstructed point cloud frame for the 3D region, and the number of points in the reconstructed point cloud for the 3D region.

Embodiment 1

Figure 2:
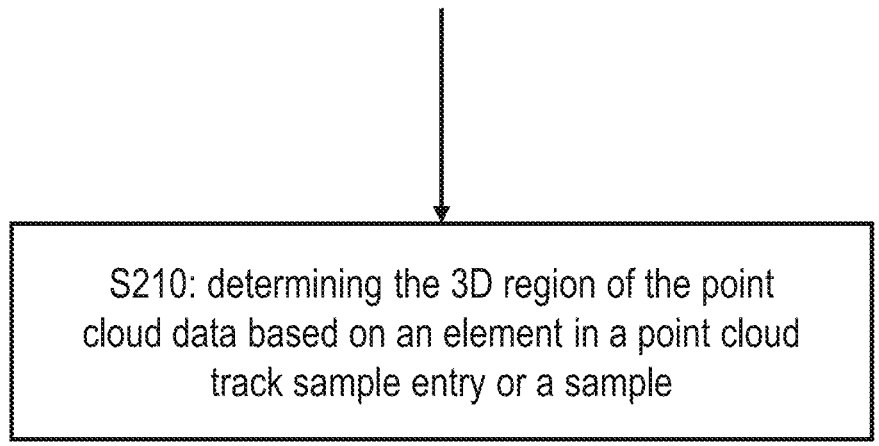
FIG. 2 is a flowchart of an example method of 3D point cloud data processing.

As shown in FIG. 2. Step S210 describes determining a 3D region of the point cloud based determined based on an element in a point cloud track sample entry or a sample. The sample entry and sample format of the point cloud track are described below in conjunction with an alternative embodiment.

V-PCC Tracks

Unlike video tracks that store traditional planar 2D video information, the V-PCC track is a new type of track for storing 3D volumetric visual information.

Volumetric Visual Track

Each volumetric visual scene is represented by a unique volumetric visual track. An ISOBMFF file may contain multiple scenes and therefore multiple volumetric visual tracks may be present in the file.

A volumetric visual track may be identified by the volumetric visual media handler type 'volv' in the HandlerBox of the MediaBox, which are defined in ISO/IEC 14496-12.

V-PCC Track Sample Entry

Sample Entry Type: 'vpc1', 'vpcg'

Container: SampleDescriptionBox ('stsd')

Mandatory: A 'vpc1' or 'vpcg' sample entry is mandatory

Quantity: One or more sample entries may be present

V-PCC tracks should use VPCCSampleEntry which extends VolumetricVisualSampleEntry with a sample entry type of 'vpc1' or 'vpcg'.

A VPCC volumetric sample entry should contain a VPCCConfigurationBox which includes a VPCCDecoderConfigurationRecord, as defined herein.

```
aligned(8) class VPCCDecoderConfigurationRecord {
    unsigned int(8) configurationVersion = 1;
    sample_stream_vpcc_header header;
    unsigned int(8) numOfSetupUnits;
    for (i=0; i<numOfSetupUnits; i++) {
        sample_stream_vpcc_unit setupUnit;
    }
}
class VPCCConfigurationBox extends Box('vpcc') {
    VPCCDecoderConfigurationRecord( ) VPCCConfig;
}
```

Alternative Embodiment 1

A 3D region of a point cloud data is associated with one or more 2D regions of a point cloud track patch frame which may contain patch data, 2D tile data or tile group data for reconstructing the 3D region of the point cloud data, using a VolumetricTileInfoBox( ) which is defined as follows.

Syntax Example

```
aligned(8) class VPCCSampleEntry( ) extends
VolumetricVisualSampleEntry ('vpc1') {
    VPCCConfigurationBox    config;
    VPCCUnitHeaderHeaderBox unit;
    VolumetricTileInfoBox( );
}
aligned(8) class VolumetricTileInfoBox extends FullBox('voti',0,0) {
    unsigned int(16) num_regions;
    for (i = 0; i < num_regions; i++) {
        SpatialRegionInfoStruct( );
        string  region_intent[i];
        unsigned int(4) layer_index[i];
        unsigned int(4) mapping_type[i];
        if(mapping_type[i] == 0) {
            unsigned int(8) num_patches[i];
        if(mapping_type[i] == 1) {
            unsigned int(8) num_tiles[i];
            for (j=0; j<num_tiles[i]; j++) {
                unsigned int(32) tile_track_group_id[i][j];
        if(mapping_type[i] == 2) {
            unsigned int(8) num_tile_groups[i];
            for (j=0; j<num_tile_groups[i]; j++) {
                unsigned int(16) tile_group_id[i][j];
            }
        }
    }
}
```

Semantics Example num_regions specify the number of 3D regions of a point cloud data.

region_intent[i]specify the intent of the region[i] of a point cloud data.

layer_index[i] specify the layer index of region[i] of a point cloud data.

mapping_type[i] specify the mapping type of region[i] of a point cloud data.

num_patches[i] specify number of patches in region[i] of a point cloud data.

num_tiles[i] specify number of 2D tiles in region[i] of a point cloud data.

tile_track_group_id[i][j] specify the array of 2D tile track group identity of region[i] of a point cloud data.

num_tile_groups[i] specify number of tile group in region[i] of a point cloud data.

tile_group_id[i][j] specify the array of tile group identity of region[i] of a point cloud data.

Alternative Embodiment 2

A 3D region of a point cloud data is associated with one or more 2D regions of a point cloud track patch frame which contain patch data for reconstructing the 3D region of the point cloud data, using a 3DRegionToPatchBox( ) which is defined in the present document.

Syntax Example

```
aligned(8) class VPCCSampleEntry( ) extends
VolumetricVisualSampleEntry ('vpc1') {
    VPCCConfigurationBox    config;
    VPCCUnitHeaderHeaderBox unit;
    3DRegionToPatchBox( );
}
aligned(8) class 3DRegionToPatchBox extends FullBox('r2pa',0,0) {
    unsigned int(16) num_regions;
    for (i = 0; i < num_regions; i++) {
        SpatialRegionInfoStruct( );
        string  region_intent[i];
```

-continued

```
        unsigned int(4) layer_index[i];
        unsigned int(8) num_patches[i];
    }
}
```

Semantics Example num_regions specify the number of 3D regions of a point cloud data.
region_intent[i]specify the intent of the region[i] of a point cloud data.
layer_index[i] specify the layer index of region[i] of a point cloud data.
num_patches[i] specify number of patches in region[i] of a point cloud data.

Alternative Embodiment 3

A 3D region of a point cloud data is associated with one or more 2D regions of a point cloud track patch frame which contain 2D tile data for reconstructing the 3D region of the point cloud data, using a 3DRegionTo2DTileBox( ) which is defined as follows.

Syntax Example

```
aligned(8) class VPCCSampleEntry( ) extends
VolumetricVisualSampleEntry ('vpc1') {
    VPCCConfigurationBox   config;
    VPCCUnitHeaderHeaderBox   unit;
    3DRegionTo2DTileBox( );
}
aligned(8) class 3DRegionTo2DTileBox extends FullBox('r2ti',0,0) {
    unsigned int(16) num_regions;
    for (i = 0; i < num_regions; i++) {
        SpatialRegionInfoStruct( );
        string  region_intent[i];
        unsigned int(4) layer_index[i];
        unsigned int(8) num_tiles[i];
        for (j=0; j<num_tiles[i]; j++) {
            unsigned int(16) tile_track_group_id[i][j];
        }
    }
}
```

Semantics Example num_regions specify the number of 3D regions of a point cloud data.
region_intent[i]specify the intent of the region[i] of a point cloud data.
layer_index[i] specify the layer index of region[i] of a point cloud data.
num_tiles[i] specify number of 2D tiles in region[i] of a point cloud data.
tile_track_group_id[i][j] specify the array of 2D tile track group identity of region[i] of a point cloud data.

Alternative Embodiments Four

A 3D region of a point cloud data is associated with one or more 2D regions of a point cloud track patch frame which contain tile group data for reconstructing the 3D region of the point cloud data, using a 3DRegionToPatchTileGroup-BoxOwhich is defined as follows.

Syntax Example

```
aligned(8) class VPCCSampleEntry( ) extends
VolumetricVisualSampleEntry ('vpc1') {
    VPCCConfigurationBox   config;
    VPCCUnitHeaderHeaderBox   unit;
    3DRegionToPatchTileGroupBox ( );
}
aligned(8) class 3DRegionToPatchTileGroupBox extends
FullBox('rptg',0,0) {
    unsigned int(16) num_regions;
    for (i = 0; i < num_regions; i++) {
        SpatialRegionInfoStruct( );
        string  region_intent[i];
        unsigned int(4) layer_index[i];
        unsigned int(8) num_tile_groups[i];
        for (j=0; j<num_tile_groups[i]; j++) {
            unsigned int(16) tile_group_id[i][j];
        }
    }
}
```

Semantics Example num_regions specify the number of 3D regions of a point cloud data.
region_intent[i]specify the intent of the region[i] of a point cloud data.
layer_index[i] specify the layer index of region[i] of a point cloud data.
num_tile_groups[i] specify number of tile group in region [i] of a point cloud data.
tile_group_id[i][j] specify the array of tile group identity of region[i] of a point cloud data.

V-PCC Track Sample Format

Each patch sample in the V-PCC track corresponds to a single point cloud frame. The samples corresponding to the frame in each component video track should have the same composition time as the V-PCC track patch samples. Each V-PCC Patch sample should contain only one V-PCC unit payload of the VPCC_PDG type, which may include one or more patch sequence unit payloads.

Alternative Embodiment 1

A 3D region of a point cloud data is associated with one or more 2D regions of a point cloud track patch frame which may contain patch data, 2D tile data or tile group data for reconstructing the 3D region of the point cloud data, using a VolumetricTileInfoBoxOwhich is defined as follows.

Syntax Example

```
aligned(8) class VPCCSample
{
    unsigned int VPCCLength = sample_size;
    for (i=0; i< VPCCLength; )  {
        sample_stream_vpcc_unitunit;
        i += (ssvh_unit_size_precision_bytes_minus1 + 1) +
             unit.ssvu_vpcc_unit_size;
    }
    VolumetricTileInfoBox( );
}
```

Semantics Example vpcc_unit_payload_size provides the number of bytes for the vpcc_unit_payload( )

vpcc_unit_payload( ) is a payload of a V-PCC unit of type VPCC_PDG and shall contain one patch_data_group( ) instance.

Alternative Embodiment 2

A 3D region of a point cloud data is associated with one or more 2D regions of a point cloud track patch frame which contain patch data for reconstructing the 3D region of the point cloud data, using a 3DRegionToPatchBox( ) which is defined as follows.

Syntax Example

```
aligned(8) class VPCCSample
{
    unsigned int VPCCLength = sample_size;
    for (i=0; i< VPCCLength; ) {
        sample_stream_vpcc_unitunit;
        i += (ssvh_unit_size_precision_bytes_minus1 + 1) +
            unit.ssvu_vpcc_unit_size;
    }
    3DRegionToPatchBox( );
}
```

Alternative Embodiment 3

A 3D region of a point cloud data is associated with one or more 2D regions of a point cloud track patch frame which contain 2D tile data for reconstructing the 3D region of the point cloud data, using a 3DRegionTo2DTileBox( ) which is defined as follows.

Syntax Example

```
aligned(8) class VPCCSample
{
    unsigned int VPCCLength = sample_size;
    for (i=0; i< VPCCLength; ) {
        sample_stream_vpcc_unitunit;
        i += (ssvh_unit_size_precision_bytes_minus1 + 1) +
            unit.ssvu_vpcc_unit_size;
    }
    3DRegionTo2DTileBox( );
}
```

Alternative Embodiment 4

A 3D region of a point cloud data is associated with one or more 2D regions of a point cloud track patch frame which contain tile group data for reconstructing the 3D region of the point cloud data, using a 3DRegionToPatchTileGroup-BoxOwhich is defined as follows.

Syntax Example

```
aligned(8) class VPCCSample
{
    unsigned int VPCCLength = sample_size;
    for (i=0; i< VPCCLength; ) {
        sample_stream_vpcc_unitunit;
        i += (ssvh_unit_size_precision_bytes_minus1 + 1) +
            unit.ssvu_vpcc_unit_size;
    }
    3DRegionToPatchTileGroupBox( );
}
```

Embodiment 2

As shown in FIG. 310, Step S310 describes determining the 3D region of the point cloud data based on elements in a timed metadata track; the timed metadata track containing a specific track reference to the point cloud track. The timing metadata track is described below in conjunction with an alternative embodiment.

V-PCC Timed Metadata Track

The V-PCC spatial region timed metadata track is linked to the respective V-PCC track by utilizing the TrackReferenceBox of the 'cdsc' track reference type, indicating the corresponding spatial region information of a point cloud data that changes dynamically over time.

The sample entry of V-PCC timed metadata track and its sample format are defined as follows:

A 3D region of a point cloud data is associated with one or more 2D regions of a point cloud track patch frame which may contain patch data, 2D tile data or tile group data for reconstructing the 3D region of the point cloud data, using a VolumetricTileInfoBoxOwhich is defined as follows.

Syntax Example

```
class VPCCSpatialRegionSampleEntry extends
MetaDataSampleEntry('pcsr') {
    VolumetricTileInfoBox( );
}
aligned(8) VPCCSpatialRegionSample( ) {
    VolumetricTileInfoBox( );
}
```

Solution 2

Figure 4:
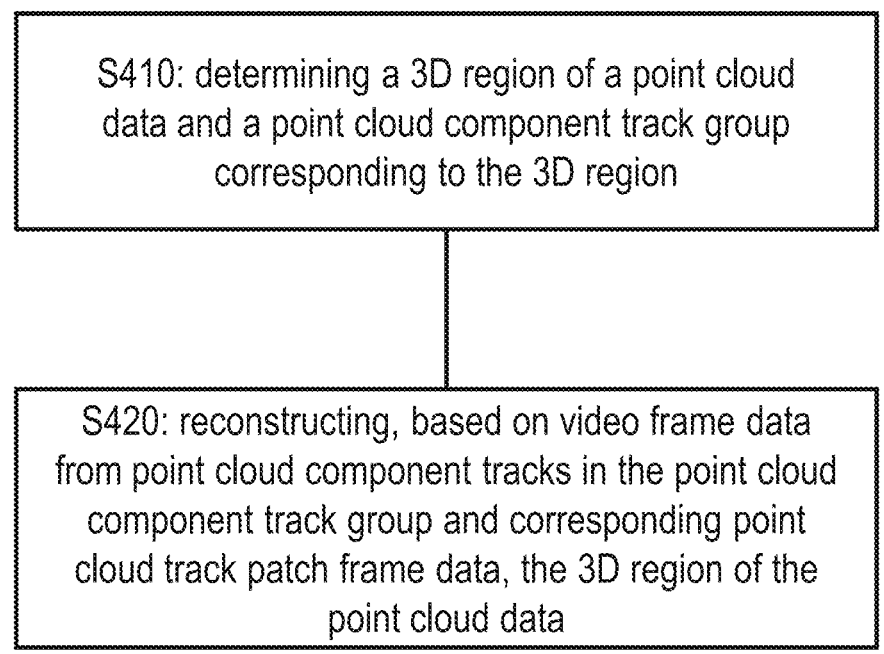
FIG. 4 is a flowchart of an example method of 3D point cloud data processing.

This example provides a point cloud data processing method. As shown in FIG. 4, the method includes the following steps:

Step S410 includes determining a 3D region of a point cloud data and a point cloud component track group corresponding to the 3D region.

Step S420 includes reconstructing, based on video frame data from point cloud component tracks in the point cloud component track group and corresponding point cloud track patch frame data, the 3D region of the point cloud data.

In some embodiments, the spatial region (e.g. a 3D region) of a point cloud data includes, or is described using, a format that is similar to the format previously described with respect to Solution 1 (see, the determining operation and subsequent paragraphs).

In some embodiments, the point cloud reconstruction operation in S420 may be performed as follows.

Inputs to the point cloud reconstruction process are:

the decoded geometry video frames from point cloud component tracks in the point cloud component track group at nominal resolution, the decoded attribute video frames from point cloud component tracks in the point cloud component track group at nominal resolution, the decoded occupancy map video frames from point cloud component tracks in the point cloud component track group at nominal resolution, the block to patch mapping information of corresponding point cloud track, and/or the frame index in output order.

In some embodiments, upscaling may be applied to the above inputs in order for providing an accurate mapping between video and other parameters and the point cloud data.

Outputs of the point cloud reconstruction process are:

the container holding a list of points in the reconstructed point cloud frame for the 3D region, and the number of points in the reconstructed point cloud for the 3D region.

Embodiment 3

Figure 5:
FIG. 5 is a flowchart of an example method of 3D point cloud data processing.

As show in FIG. 5, Step S510 describes determining the 3D region of the point cloud data and a point cloud component track group corresponding to the 3D region based on an element in the track group data box of a point cloud component track; wherein the point cloud component track group includes: an occupancy map track, a geometry track, or an attribute track.

Video-Encoded V-PCC Component Tracks

Since it may not be meaningful to display the decoded frames from attribute, geometry, or occupancy map tracks without reconstructing the point cloud at the player side, a restricted video scheme type is defined for these video-coded tracks.

V-PCC component video tracks may be represented in the file as restricted video, and identified by 'pccv' in the scheme_type field of the SchemeTypeBox of the RestrictedSchemeInfoBox of their restricted video sample entries.

There should be a SchemeInformationBox in the V-PCC component video track which includes a VPCCUnitHeaderBox.

V-PCC component video tracks include at least: a 2D video encoded occupancy map track, a 2D video encoded geometry track, and zero or more 2D video encoded attribute tracks.

Alternative Embodiment 1

All the V-PCC component tracks (occupancy map track, geometry track and attribute tracks) corresponding to the same spatial region of point cloud data may be grouped together using the track grouping tool of ISO/IEC 14496-12 by adding a specific type of VPCCTrackGroupBox('pctg') to all component tracks. The VPCCTrackGroupBox in the V-PCC component video tracks is described below in conjunction with an optional implementation.

VPCCTrackGroupBox

Box Type: 'pctg'
Container: TrackBox
Mandatory: No
Quantity: Zero or one

TrackGroupTypeBox with track_group_type equal to 'pctg' is VPCCTrackGroupBox which indicates a V-PCC component track group.

V-PCC component tracks that have the same value of track_group_id within TrackGroupTypeBox with track_group_type equal to 'pctg' belong to the same track group with 3D spatial relationships (e.g. corresponding to the same 3D region of the point cloud data). The track_group_id within TrackGroupTypeBox with track_group_type equal to 'pctg' could be used as the identifier of the spatial region of point cloud data.

V-PCC component tracks corresponding to the same spatial region have the same value of track_group_id for track_group_type 'pctg', and the track_group_id of tracks from one spatial region differs from the track_group_id of tracks from any other spatial region.

Syntax Example

```
aligned(8) class VPCCTrackGroupBox extends
TrackGroupTypeBox('pctg') {
   SpatialRegionInfoStruct( );
}
```

The V-PCC component video track may include a TrackGroupTypeBox with track_group_type equal to 'pctg', that is, a VPCCTrackGroupBox, and an optional embodiment for the V-PCC component video track which includes a VPCCTrackGroupBox is described below.

Figure 6:
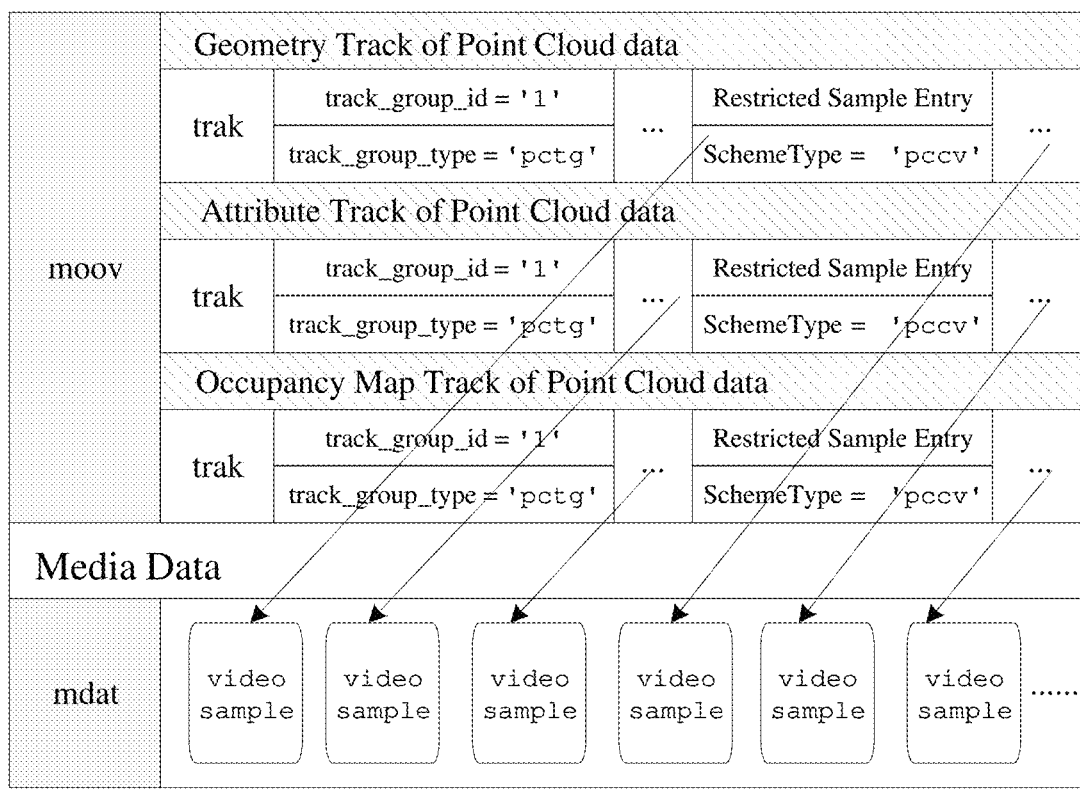
FIG. 6 shows an example of data syntax.

FIG. 6 is a schematic diagram of a VPCCTrackGroupBox in a V-PCC component track according to an embodiment.

As shown in FIG. 6, a point cloud data file includes: one occupancy map component video track, one Geometry component video tracks, and zero or more Attribute component video tracks The different V-PCC component video track includes a TrackGroupTypeBox with track_group_type equal to 'pctg', that is, a VPCCTrackGroupBox, and has the same track_group_id value, indicating that the V-PCC occupancy map, geometry, and attributes component video tracks form a V-PCC component track group that corresponds to the same spatial region of point cloud data (for example, the 3D region of the point cloud).

Alternative Embodiment 2

All the V-PCC component 2D tile tracks (occupancy map 2D tile track, geometry 2D tile track and attribute 2D tile tracks) corresponding to the same spatial region of point cloud data may be grouped together using the track grouping tool of ISO/IEC 14496-12 by adding a specific type of VPCC2DTileGroupBox('pcti') to all component 2D tile tracks. The VPCC2DTileGroupBox in the V-PCC component video tracks is described below in conjunction with an optional implementation.

VPCC2DTileGroupBox

Box Type: 'pcti'
Container: TrackBox
Mandatory: No
Quantity: Zero or one

TrackGroupTypeBox with track_group_type equal to 'pcti' is VPCC2DTileGroupBox which indicates a V-PCC component 2D tile track group.

V-PCC component 2D tile tracks that have the same value of track_group_id within TrackGroupTypeBox with track_group_type equal to 'pcti' belong to the same track group with 3D spatial relationships (e.g. corresponding to the same 3D region of the point cloud data). The track_group_id within TrackGroupTypeBox with track_group_type equal to 'pcti' could be used as the identifier of the spatial region of point cloud data.

V-PCC component 2D tile tracks corresponding to the same spatial region have the same value of track_group_id for track_group_type 'pcti', and the track_group_id of tracks from one spatial region differs from the track_group_id of tracks from any other spatial region.

Syntax Example

```
aligned(8) class VPCC2DTileGroupBox extends
TrackGroupTypeBox('pcti') {
   SpatialRegionInfoStruct( );
}
```

Alternative Embodiment 3

The point cloud component Tile Group track in all point cloud components (geometric components, occupancy graph components, attribute components) corresponding to the same point cloud 3D region can be composed of a specific type of track group data box (Track Group Box). Point cloud component Tile Group track group for 3D region. The following describes the point cloud component Tile Group data box in the point cloud component Tile Group track in combination with an optional implementation.

All the V-PCC component tile group tracks (occupancy map tile group track, geometry tile group track and attribute tile group tracks) corresponding to the same spatial region of point cloud data may be grouped together using the track grouping tool of ISO/IEC 14496-12 by adding a specific type of VPCCTileGroupBox('ptgg') to all component 2D tile tracks. The VPCCTileGroupBox in the V-PCC component video tracks is described below in conjunction with an optional implementation.

VPCCTileGroupBox
    Box Type: 'ptgg'
    Container: TrackBox
    Mandatory: No
    Quantity: Zero or one The track group type data box (TrackGroupTypeBox) whose track group type (track_group_type) is equal to 'ptgg' is the point cloud component Tile Group group data box, indicating the point cloud component Tile Group track group in the point cloud component. All point cloud components of the point cloud component Tile Group group data box having the same track group identifier (track_group_id) value belong to a track group having a spatial region relationship (for example, a 3D region corresponding to the same point cloud). The track group identifier of the point cloud component group group data box can also be used as the point cloud space area identifier (region_id), and the value of the track group identifier corresponding to different point cloud space areas should be different.

TrackGroupTypeBox with track_group_type equal to 'ptgg' is VPCCTileGroupBox which indicates a V-PCC component tile group track group.

V-PCC component tile group tracks that have the same value of track_group_id within TrackGroupTypeBox with track_group_type equal to 'ptgg' belong to the same track group with 3D spatial relationships (e.g. corresponding to the same 3D region of the point cloud data). The track_group_id within TrackGroupTypeBox with track_group_type equal to 'ptgg' could be used as the identifier of the spatial region of point cloud data.

V-PCC component tile group tracks corresponding to the same spatial region have the same value of track_group_id for track_group_type 'ptgg', and the track_group_id of tracks from one spatial region differs from the track_group_id of tracks from any other spatial region.

Syntax Example

```
aligned(8) class PCCTileGroupBox extends
TrackGroupTypeBox('ptgg') {
   SpatialRegionInfoStruct( );
   unsigned int(16) tile_group_id;
}
```

Semantics Example tile_group_id specify the tile group identity of a V-PCC component tile group track group.

Embodiment 4

V-PCC Timed Metadata Track

The V-PCC spatial region timed metadata track is linked to the respective V-PCC component track group by utilizing the TrackReferenceBox of the 'cdsc' track reference type, indicating the corresponding spatial region information of a point cloud data that changes dynamically over time.

The V-PCC spatial region timed metadata track containing 'cdsc' track reference to a track_group_id value of V-PCC component track group describes each V-PCC component track in the track group individually.

The sample entry of the V-PCC timed metadata track and its sample format are defined as follows:

Syntax Example

```
class VPCCSpatialRegionSampleEntry extends
MetaDataSampleEntry('pcsr') {
   SpatialRegionInfoStruct( );
}
aligned(8) VPCCSpatialRegionSample( ) {
   SpatialRegionStruct( );
}
```

FIG. 6 shows an example file format in which video samples are arranged as media data. The video samples are sequenced according to the tracks (shows as trak). One example of track includes a geometry track of point cloud data that is identified based on a track group entry and a specific track group type (pctg). Another example of track shown is the attribute track of the point cloud data. A third example of track is an occupancy map trak of the point cloud data. The occupancy map, for example, contains data that provides a mapping of various points in a 3D region to corresponding one or mode 2D region.

Figure 7:
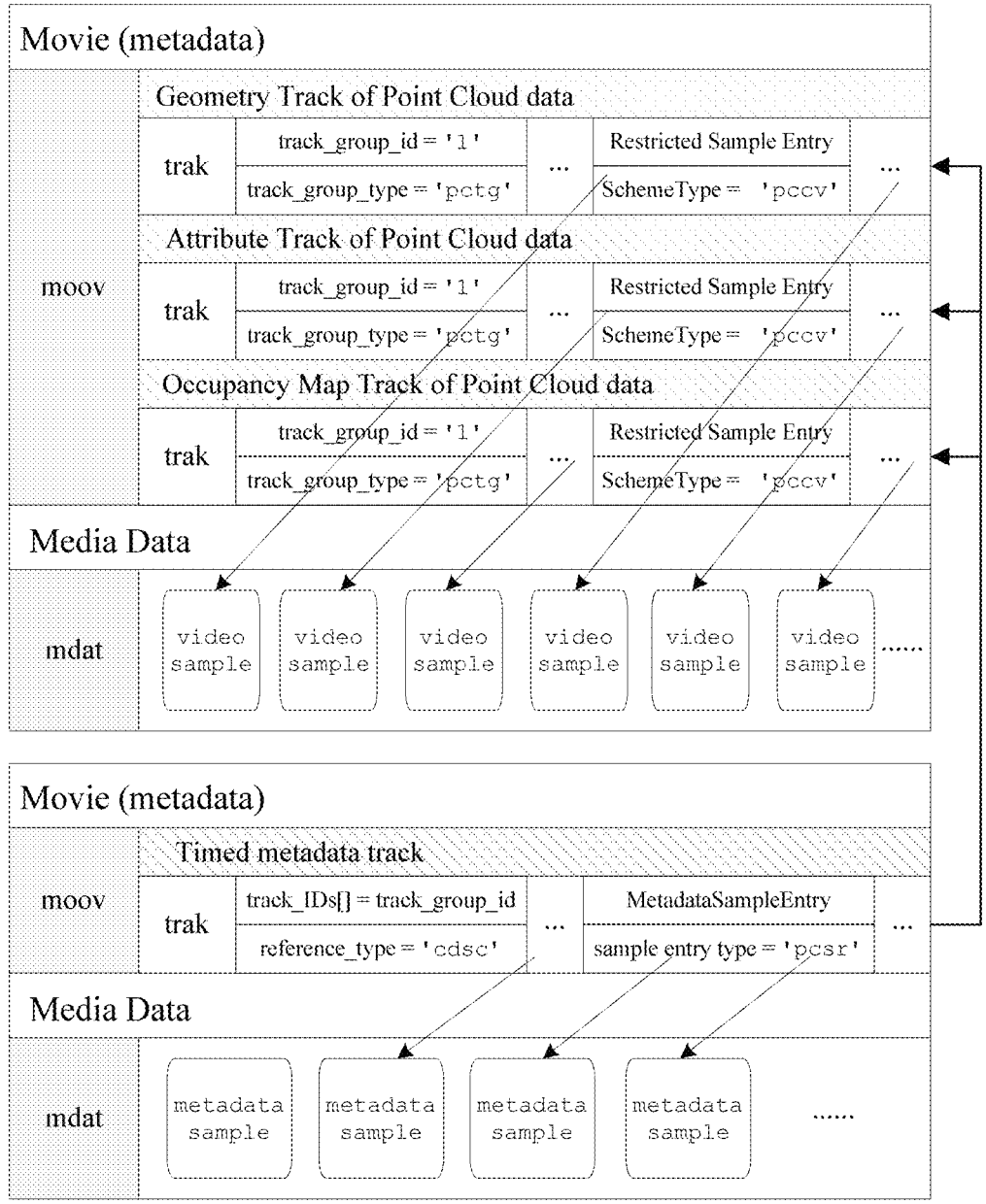
FIG. 7 shows another example data syntax.

FIG. 7 is a schematic diagram of a V-PCC spatial region time metadata track reference to V-PCC component track group according to an embodiment of the present invention.

As shown in FIG. 7, the TrackReferenceBox is included in the V-PCC timed metadata track with the sample entry type equal to 'pcsr', and the track_IDs[ ]in the TrackReferenceBox reference to the track_group_id value of V-PCC component track group. The reference_type in the TrackReferenceBox takes the value 'cdsc', and indicates that the timed metadata track contains the content description information of the referenced V-PCC component track group. In this embodiment, the V-PCC spatial region timed metadata video track refers to a track group identifier of V-PCC component track group in which the track_group_type of the V-PCC component track group is equal to 'pctg', indicating the corresponding spatial region information of a point cloud data that changes dynamically over time.

Some embodiments may preferably implement the following technical solutions.

Figure 3:
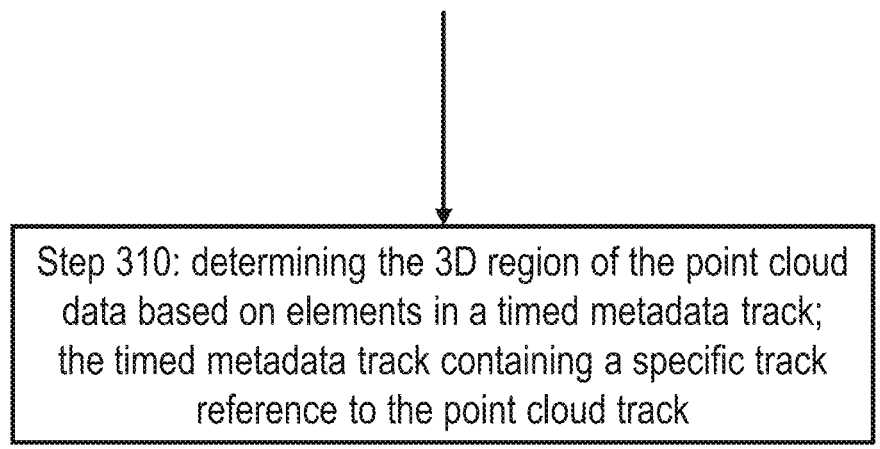
FIG. 3 is a flowchart of an example method of 3D point cloud data processing.

1. A method of point cloud data processing, comprising: determining a 3D region of a point cloud data and a 2D region of a point cloud track patch frame onto which one or more points of the 3D region are projected; reconstructing, from patch frame data included in the 2D region and video frame data of corresponding point cloud component tracks, the 3D region of the point cloud data. An example of this solution is described with reference to Solution 1 and FIG. 1.
2. The method according to solution 1, wherein the 3D region of the point cloud data and the 2D region of the point cloud track patch frame onto which one or more points of the 3D region are projected are determined based on an element in a point cloud track sample entry or a sample. An example of this solution is described with reference to FIG. 2.
3. The method according to solution 1 or solution 2, comprising: identifying a patch data box in the point cloud track according to a specific box type, wherein the patch data box indicates that the 2D region contains patch data for reconstructing the 3D region of the point cloud data.
4. The method according to solution 1 or solution 2, comprising: identifying a 2D tile data box in the point cloud track according to a specific box type, wherein the 2D tile data box indicating that the 2D region contains 2D tile data of the 3D region of the point cloud data.
5. The method according to solution 1 or solution 2, comprising: identifying a tile group data box in the point cloud track according to a specific box type, wherein the tile group data box indicates that the 2D region contains tile group data for reconstructing the 3D region of the point cloud data.
6. The method of solution 1, wherein the determining comprises: determining the 3D region of the point cloud data based on elements in a timed metadata track; the timed metadata track containing a specific track reference to the point cloud track. FIG. 3 and related text described some additional features and embodiments of this solution.
7. The method according to solution 1 or solution 6, comprising: identifying the timed metadata track according to a specific sample entry type, the timed metadata track indicating that the 2D region contains one of the following information for reconstructing the 3D region of the point cloud data: patch data, 2D tile data, tile group data.
8. A method of point cloud data processing, comprising: determining a 3D region of a point cloud data and a point cloud component track group corresponding to the 3D region; and reconstructing, based on video frame data from point cloud component tracks in the point cloud component track group and corresponding point cloud track patch frame data, the 3D region of the point cloud data. FIG. 4, solution 2 and related text describes some embodiments and features of this solution.
9. The method according to solution 8, wherein the determining the 3D region comprises: determining the 3D region of the point cloud data and a point cloud component track group corresponding to the 3D region based on an element in the track group data box of a point cloud component track; wherein the point cloud component track group includes: an occupancy map track, a geometry track, or an attribute track.
10. The method according to solution 8 or 9, comprising: identifying a track group data box in the point cloud component track according to a specific track group type, the track group data box indicating the 3D region of the point cloud data corresponding to the point cloud component track group; wherein, the track group data box of point data component tracks corresponding to the same 3D region of a point cloud data have the same track group identity.
11. The method according to solution 8 or 9, comprising: identifying a track group data box in the point cloud component 2D tile track according to the specific track group type, the track group data box indicating the 3D region of the point cloud data corresponding to the point cloud component 2D tile track group; wherein, the track group data box of point cloud component 2D tile tracks corresponding to the same 3D region of a point cloud data have the same track group identity.
12. The method according to solution 8 or 9, comprising: identifying a track group data box in the point cloud component tile group track according to the specific track group type, the track group data box indicating the 3D region of the point cloud data corresponding to the point cloud component tile group track group; wherein, the track group data box of point cloud component tile group tracks corresponding to the same 3D region of a point cloud data have the same track group identity.
13. The method according to solution 8, wherein the determining comprises: determining the 3D region of the point cloud data and a point cloud component track group corresponding to the 3D region based on elements in a timed metadata track; the timed metadata track containing a specific track reference to the point cloud component track group.
14. The method of solution 8 or solution 13 comprising: identifying the timed metadata track according to a specific sample entry type, the timed metadata track indicating the 3D region of a point cloud data corresponding to the point cloud component track group.
15. The method of any of solutions 1 to 14, wherein the 3D region includes points that are projected onto more than one 2D regions of the point cloud track patch frame.
16. The method according to any one of solutions 1 to 15, wherein information for a 3D region of a point cloud data includes: 3D bounding box parameters, including: a x, y, z coordinate offset of the 3D region, and/or a width, a height, and a depth of the 3D region.
17. The method of any of solutions 1-16, wherein a 3D region of a point cloud data further comprises one of the following information: the label of a point cloud data; the number of points of a point cloud data; or the number and type of attributes of a point cloud.
18. The method according to any one of solutions 1 to 17, wherein information for the 2D region of the point cloud track patch frame includes: 2D bounding box parameters, including: x, y coordinate offset of the 2D region, and/or a width, and a height of the 2D region.

19. The method of any of solutions 1-18, wherein a 2D region of a point cloud track patch frame further comprises one of the following information: the Layer information, the description information, the number of patches; the 2D tile information, or the tile group information;

20. A video processing apparatus comprising a processor configured to implement a method recited in any of previous solutions.

21. A computer readable medium having code for executing an above-described method by a processor stored thereon.

FIG. 6 and FIG. 7 show examples of file formats used for facilitating the point cloud data processing techniques described herein.

Figure 8:
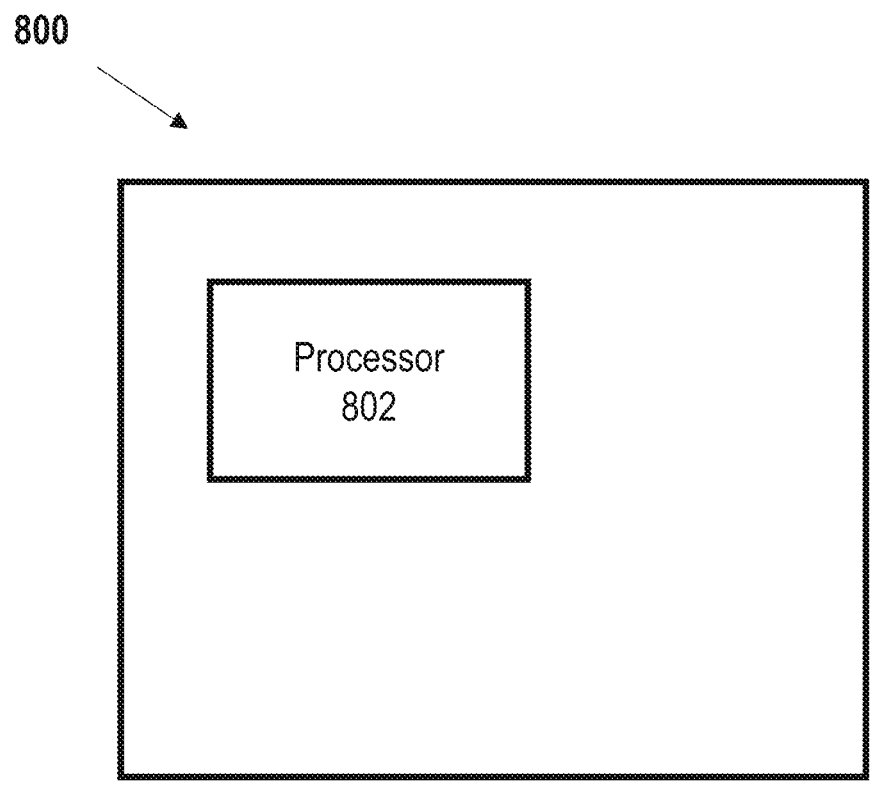
FIG. 8 is a block diagram of an example hardware apparatus.

FIG. 8 is a block diagram of an example of an apparatus 800 used for processing of point cloud data. The apparatus 800 includes a processor 802 that is programmed to implement a method described in the present document. The apparatus 800 may further include dedicated hardware circuitry for performing specific functions such as data decoding, accessing component tracks and so on. The apparatus 800 may also include a memory that stores executable code for the processor and/or 2D volumetric data and other data, including data complying with the various syntax elements described in the present document.

In some embodiments, a 3D point cloud data encoder may be implemented to generate a bitstream representation of a 3D point cloud by encoding the 3D spatial information using the syntax and semantics as described in the present document.

The point cloud data encoding or decoding apparatus may be implemented as a part of a computer, a user device such as a laptop, a tablet or a gaming device.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of point cloud data processing, comprising:
   determining a 3D region of a point cloud data;
   determining a 2D region of a point cloud track patch frame, wherein one or more points in the point cloud data of the 3D region are projected into the 2D region, wherein the 2D region is generated based on at least one of the following division principles: 1) defining the 2D region based on a patch position on the point cloud track patch frame 2) defining the 2D region based on a tile position on the point cloud track patch frame or 3) defining the 2D region based on a tile group position on the point cloud track patch frame;
   identifying a first box in the point cloud track according to a specific box type, wherein the first box indicates that the 2D region contains patch data for reconstructing the 3D region of the point cloud data;
   identifying a second box in the point cloud track according to the specific box type, wherein the second box indicates that the 2D region contains 2D tile data of the 3D region of the point cloud data; and
   reconstructing, from patch frame data included in the 2D region and video frame data of corresponding point cloud component tracks, the 3D region of the point cloud data.

2. The method according to claim 1, wherein the 3D region of the point cloud data and the 2D region of the point cloud track patch frame onto which one or more points of the 3D region are projected are determined based on an element in a point cloud track sample entry or a sample.

3. The method according to claim 1, wherein the determining comprises:
   determining the 3D region of the point cloud data based on elements in a timed metadata track, the timed metadata track containing a specific track reference to the point cloud track patch frame.

4. The method according to claim 3, comprising:
   identifying the timed metadata track according to a specific sample entry type, the timed metadata track indicating that the 2D region contains one of the following information for reconstructing the 3D region of the point cloud data:
   patch data, 2D tile data, tile group data.

5. The method according to claim 1, wherein information for the 3D region of the point cloud data includes:
   3D bounding box parameters, including: a x, y, z coordinate offset of the 3D region, and/or a width, a height, and a depth of the 3D region.

6. The method according to claim 1, wherein information for the 2D region of the point cloud track patch frame includes:
   2D bounding box parameters, including: x, y coordinate offset of the 2D region, and/or a width, and a height of the 2D region; a description information of patches, or a 2D tile information.

7. A method of point cloud data processing, comprising:
   determining a 3D region of a point cloud data;
   determining a point cloud component track group corresponding to the 3D region;
   identifying a first box in the point cloud component track according to a specific track group type, the first box indicating the 3D region of the point cloud data corresponding to the point cloud component track group; wherein, the first box of point data component tracks corresponding to the same 3D region of the point cloud data have the same track group identity; and
   reconstructing, based on video frame data from point cloud component tracks in the point cloud component track group and corresponding point cloud track patch frame data, the 3D region of the point cloud data, wherein the video frame data comprises at least one of 1) decoded geometry video frames, 2) decoded attribute video frames, 3) decoded occupancy map video frames, 4) a block to patch mapping information or 5) a frame index in output order.

8. The method according to claim 7, wherein the determining the 3D region comprises:
   determining the 3D region of the point cloud data and the point cloud component track group corresponding to the 3D region based on an element in the track group data box of a point cloud component track; wherein the point cloud component track group includes: an occupancy map track, a geometry track, or an attribute track.

9. The method according to claim 7, wherein the determining comprises:
   determining the 3D region of the point cloud data and the point cloud component track group corresponding to the 3D region based on elements in a timed metadata track; the timed metadata track containing a specific track reference to the point cloud component track group.

10. The method of claim 9, comprising:
    identifying the timed metadata track according to a specific sample entry type, the timed metadata track indicating the 3D region of the point cloud data corresponding to the point cloud component track group.

11. The method according to claim 7, wherein information for the 3D region of the point cloud data includes:
    3D bounding box parameters, including: a x, y, z coordinate offset of the 3D region, and/or a width, a height, and a depth of the 3D region.

12. A video processing apparatus comprising a processor configured to implement a method of point cloud data processing, comprising:
    determining a 3D region of a point cloud data;
    determining a 2D region of a point cloud track patch frame onto which, wherein one or more points in the point cloud data of the 3D region are projected into the 2d region,
    wherein the 2D region is generated based on at least one of the following division principles: 1) defining the 2D region based on a patch position on the point cloud track patch frame 2) defining the 2D region based on a tile position on the point cloud track patch frame or 3) defining the 2D region based on a tile group position on the point cloud track patch frame;
    identifying a first box in the point cloud track according to a specific box type, wherein the first box indicates that the 2D region contains patch data for reconstructing the 3D region of the point cloud data;
    identifying a second box in the point cloud track according to the specific box type, wherein the second box indicates that the 2D region contains 2D tile data of the 3D region of the point cloud data; and
    reconstructing, from patch frame data included in the 2D region and video frame data of corresponding point cloud component tracks, the 3D region of the point cloud data.

13. The video processing apparatus according to claim 12, wherein the 3D region of the point cloud data and the 2D region of the point cloud track patch frame onto which one or more points of the 3D region are projected are determined based on an element in a point cloud track sample entry or a sample.

14. The video processing apparatus of claim 12, wherein the determining comprises:

determining the 3D region of the point cloud data based on elements in a timed metadata track; the timed metadata track containing a specific track reference to the point cloud track patch frame.

15. The video processing apparatus of claim 14, wherein the processor is further configured for:

identifying the timed metadata track according to a specific sample entry type, the timed metadata track indicating that the 2D region contains one of the following information for reconstructing the 3D region of the point cloud data:

patch data, 2D tile data, tile group data.

16. The video processing apparatus according to claim 12, wherein information for the 3D region of the point cloud data includes:

3D bounding box parameters, including: a x, y, z coordinate offset of the 3D region, and/or a width, a height, and a depth of the 3D region.

17. The video processing apparatus according to claim 12, wherein information for the 2D region of the point cloud track patch frame includes:

2D bounding box parameters, including: x, y coordinate offset of the 2D region, and/or a width, and a height of the 2D region; a description information of patches, or a 2D tile information.

* * * * *